United States Patent
Allen

[15] 3,703,330
[45] Nov. 21, 1972

[54] OPTICAL ROTARY JOINT
[72] Inventor: Philip J. Allen, North Forestville, Md.
[73] Assignee: The United States of America as represented by the Secretary of the Navy
[22] Filed: June 15, 1971
[21] Appl. No.: 153,307

[52] U.S. Cl. .................. 350/157, 350/52, 350/152, 350/159
[51] Int. Cl. ............................................. G02f 1/24
[58] Field of Search........ 350/52, 147, 152, 157, 159; 250/213, 219, 199; 340/172.5

[56] References Cited

UNITED STATES PATENTS

| | | | |
|---|---|---|---|
| 3,155,832 | 11/1964 | Bouwers | 350/52 |
| 2,669,902 | 2/1954 | Barnes | 250/152 |
| 2,274,110 | 2/1942 | Ward, Jr. | 350/157 |
| 3,612,645 | 10/1971 | Paine et al. | 350/52 |

OTHER PUBLICATIONS

Ukhanov; "A Germanium Prism As A Converter of Linearly Polarized to Circularly Polarized Infrared Radiation" Optics & Spectros Vol. 27, No. 2, (Aug. 1969) pp. 170–171.

Primary Examiner—David Schonberg
Assistant Examiner—Paul R. Miller
Attorney—R. S. Sciascia et al.

[57] ABSTRACT

This disclosure is directed to means for transmitting a polarized optical beam between two parts of a system in relative rotation on different levels such that the output polarization does not change with relative rotation about a common axis. Such a system may be used for optical radar in which the laser transmitting is stationary on one level with the rotatable optical reflectors on another level.

3 Claims, 7 Drawing Figures

INVENTOR
PHILIP J. ALLEN

INVENTOR
PHILIP J. ALLEN

OPTICAL ROTARY JOINT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heretofore, optical systems including optical elements that have relative rotational movement which employ conventional mirrors commonly suffer a change in beam polarization with change in relative angular orientation of the various parts. In order to prevent a change in beam polarization, systems have been employed upon which all optical elements rotate together. In other systems polarization changes are sometimes compensated by the use of auxiliary rotating optical components such as wave plates, which usually have to be specially programmed for proper compensation. Such systems may also employ many different types of coated mirrors which generally exhibit a different reflectivity (phase and/or amplitude change) for different polarizations when the mirror is used at an angle of incidence of 45°.

SUMMARY OF THE INVENTION

This disclosed invention makes use of special prisms which when properly aligned convert between linear and circular polarizations while at the same time refracting and reflecting the beam through a 90° angle. The prisms are so positioned that when one prism rotates in a plane relative to the other prism the polarization remains the same as if the prism was stationary. In these special prisms a properly-aligned linearly polarized beam enters one prism and emerges as a circularly polarized beam at right angles to the input beam. The second prism converts the circularly polarized beam to a linearly polarized beam and directs the beam in a plane parallel with the beam that enters the first prism or in a direction at right angles to the beam entering the second prism. Since the beam between the two prisms is circularly polarized and is characterized by axial symmetry, relative rotation about the common axis does not alter the polarization of the output beam.

STATEMENT OF THE OBJECTS

It is therefore an object of this invention to provide an optical system in which the optical elements may have relative rotational movement without a change in polarization from the input and output beams.

Another object is to provide a system which permits one to secure a polarized light source in a fixed position while directing the light output in any direction relative thereto without an effective change in its polarization.

Still another object is to provide suitable rotary joints in connection with optical prisms to permit rotation of one prism with respect to another.

Yet another object is to provide a prism which is suitable for converting linear polarized light into circular polarized light with only one reflection within the prism.

Other objects will become apparent upon consideration of a more detailed description of the invention as shown in the drawing.

DESCRIPTION OF THE DRAWINGS

Figure 1:
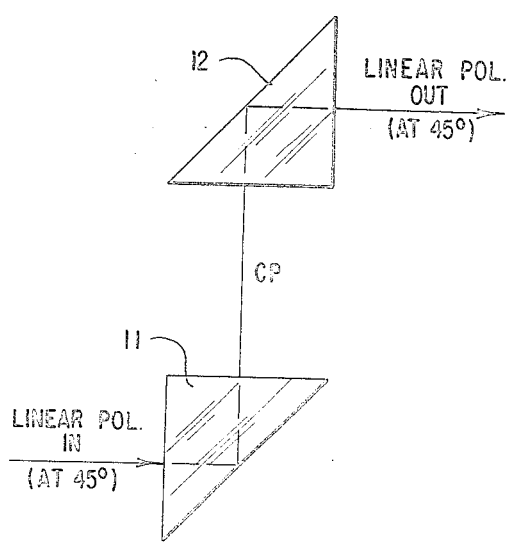
FIG. 1 illustrates two special prisms in optical alignment with the light entering one prism on one side and leaving the other prism in the same direction but on a different plane.
Figure 2:
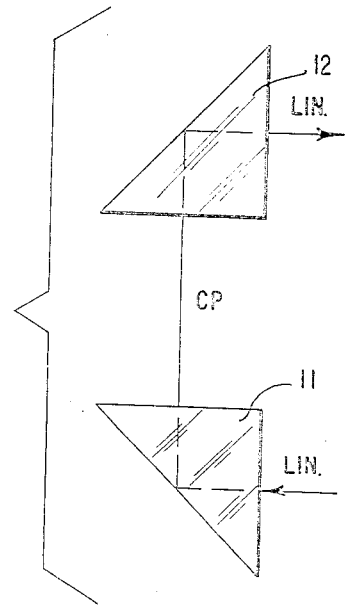
FIG. 2 illustrates two prisms in optical alignment with the light entering one prism and leaving the other prism in the direction from which the light originated.

Now referring to the drawings there is shown by illustration in FIGS. 1 and 2 a simple system for redirecting polarized light by the use of special prisms. A linearly polarized light beam 10 enters a prism 11 aligned at a tilt angle of either plus or minus 45° and is reflected from within the prism and emerges at 90° relative to the incoming light toward a prism 12. The linearly polarized light incident on prism 11 is converted to circularly polarized light which is incident on prism 12 and reflected from prism 12 as linearly polarized light at a 90° angle relative to the incident light. FIG. 1 illustrates the light entering prism 11 from one direction and emerging from prism 12 in the same direction from which the light originated. FIG. 2 is similar, only the light enters and leaves the system in the opposite direction from which it originated. Obviously the emerging light could be directed in any direction in the same plane by rotation of prism 12 through any desired angular movement including 360° with respect to prism 11. The procedure is reversible where the light could enter prism 12 and directed through prism 11.

For operation in converting linearly polarized light to circularly polarized light and back to linearly polarized light, the input beam must be linearly polarized and in the $TEM_{\infty}$ mode, and the plane of polarization must be aligned at a tilt angle of either plus or minus 45°. As such, between the two prisms, propagation takes place via circularly polarized waves of either right hand or left hand sense in the $TEM_{\infty}$ mode.

The special prisms are made of a transparent material having an index of refraction which is greater than 2.41 such that with a single total internal reflection one can achieve a 90° differential phase shift between orthogonal linearly polarized components as required to convert from linear to circular polarized light. It has been determined that the following material may be used, germanium, gallium arsenide, cadmium telluride, silicon and cholcogenide glass which are transparent in the infrared region and have an index of refraction which exceeds 2.41. It is to be noted that the material must be transparent, homogenous and isotropic at the operating wavelength. It has been determined, theretofore, that the relative phase change between so-called "parallel" and "perpendicular" linearly polarized components on internal reflection can be expressed as $$\tan \frac{\delta}{2} = \frac{\cos \theta \sqrt{\sin^2 \theta - n^2}}{\sin^2 \theta}$$

where $\delta$ is the relative phase difference, $\theta$ is the internal angle of incidence, and $n$ is the ratio of the refractive index in air, $n_1$, to the refractive index in the prism medium, $n_2$, $n = n_1/n_2$. In order to produce circular polarization, $\delta$ must be 90° hence $\tan(\delta/2) = 1$. Solving the equation for $\theta$ when $\tan(\delta/2) = 1$ the equation becomes:

$$\sin^2 \theta = \frac{(n^2+1) + \sqrt{n^4 - 6n^2 + 1}}{4}$$

using this equation, the internal angles of incidence for the three of the different materials set forth above as being suitable as a prism for generating circular polarization at 10.6 micrometers are set forth as follows:

| Material | $n_2$ | $n = 1/n_2$ | $n^2$ | $\theta$ | |
|---|---|---|---|---|---|
| Ge | 4.0029 | 0.2498 | 0.06242 | 42° 56' | 15° 2' |
| GaAs | 3.4 | 0.294 | 0.0865 | 41° 55' | 18° 8' |
| CdTe | 2.6 | 0.385 | 0.148 | 37° 58' | 26° 15' |

Generally, as noted, there are two solutions for $\theta$.

Figure 3:
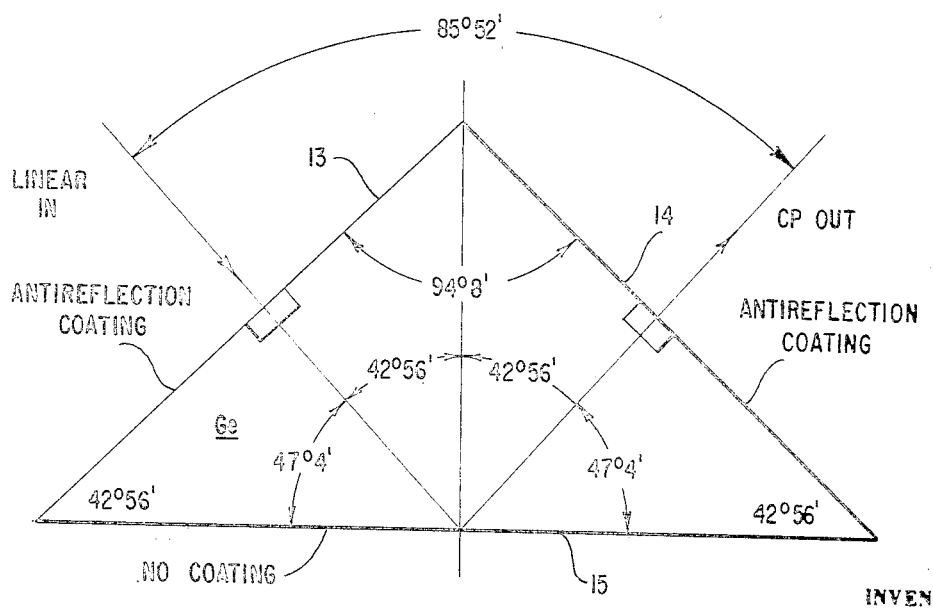
FIGS. 3 and 4 illustrate two different special prisms showing the angular relationships of the sides, and input and output beams.
Figure 4:
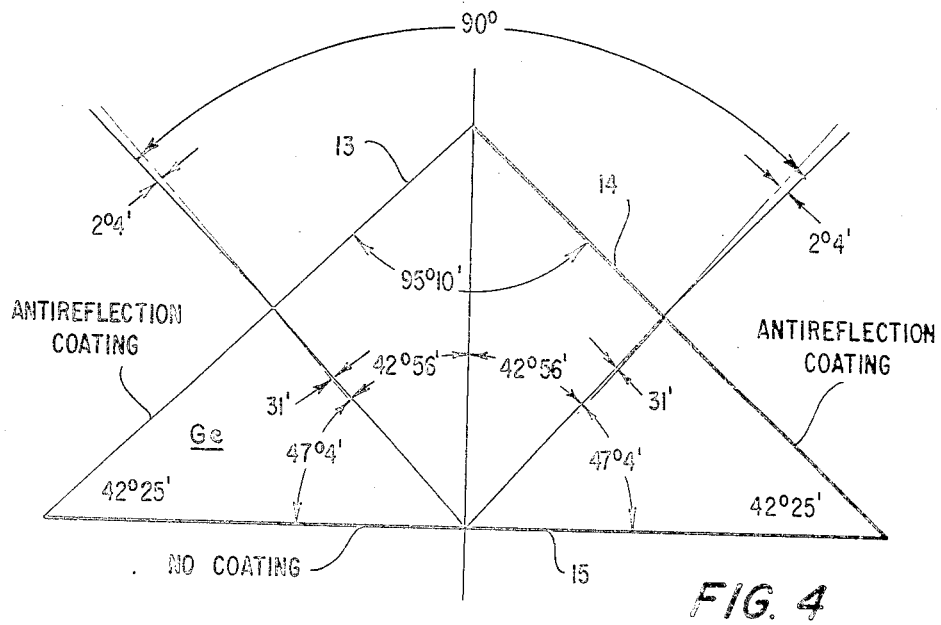

Using one of the values of $\theta$ (42° 56') derived for Germanium, two slightly different circularly polarizing prisms have been designed for use in the 10 micrometer region. These are illustrated in FIGS. 3 and 4. The prism in FIG. 3, designed for normal incidence at the input face, results in an odd angle (85° 52') between input and output rays. The slight variation shown in FIG. 4 is compensated so that input and output rays are at right angles, a more convenient situation for some applications. The prism shown by illustration in FIG. 4 employs a small angle of refraction at input and output faces to obtain the compensation necessary to satisfy the right-angle condition. Additionally, such an angle avoids any light being reflected back along the incident light path to avoid interference between the incident and reflected light. Input and output faces 13 and 14 are anti-reflection coated to minimize reflections at these interfaces which otherwise would be significant because of the high refractive index of the germanium. At 10.6 micrometers, a suitable anti-reflection coating for germanium consists of a one-quarter-wavelength layer of zinc sulfide (ZnS). Prisms for use at other wavelengths and those made of other materials would not necessarily have the same angular specifications, as the required angles are determined by the refractive index at the operating wavelength.

Figure 5:
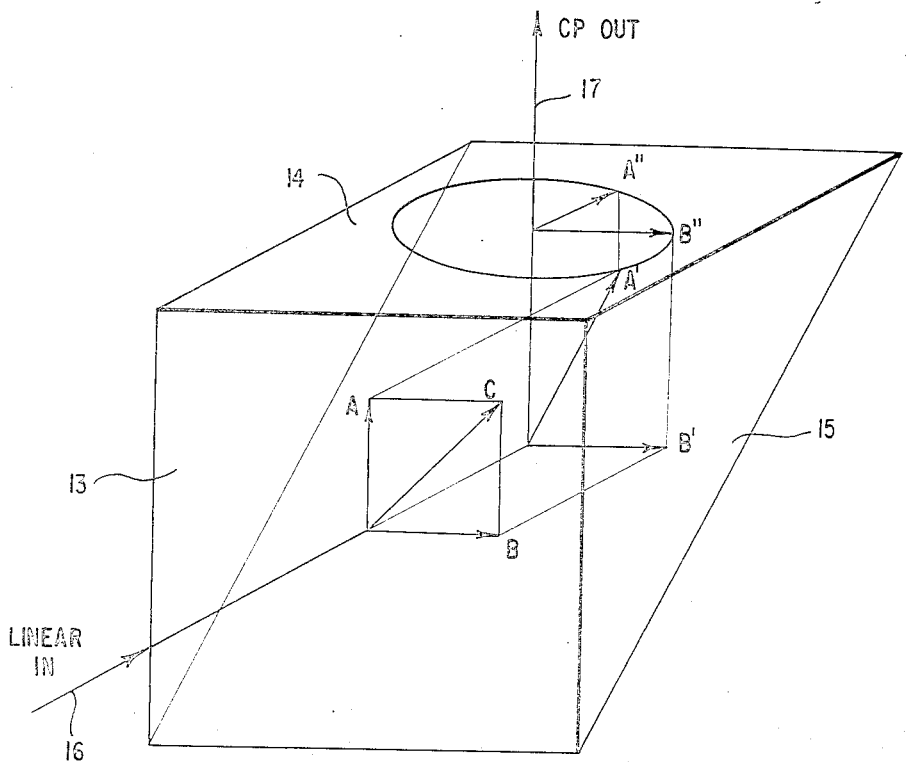
FIG. 5 illustrates graphically the changing of a linear polarized light to circular polarized light.

FIG. 5 attempts to illustrate the principle of the circular polarizing prism. A linearly polarized wave 16 incident from the left is represented by the arrow C on the entrance face of the prism. This vector can be resolved into two equal-amplitude, equi-phase, orthogonal linearly polarized components A and B which propagate into the prism and are totally reflected as A' and B' from the diagonal prism-air interface. By proper design of the prism, there will be a 90° phase difference introduced between A' and B' on total internal reflection. The two equal and orthogonally polarized components emerge as A'' and B'' which differ in phase by 90°. This condition corresponds to a circularly polarized wave 17. The sense of circular polarization emerging depends on whether the input linear polarization C is oriented as shown, or 90° from that position. The second prism (FIG. 1) simply reverses this process, and a linearly polarized wave emerges.

It is emphasized that these prisms are bidirectional and reciprocal, and beams can pass through the prisms in both directions.

Figure 6:
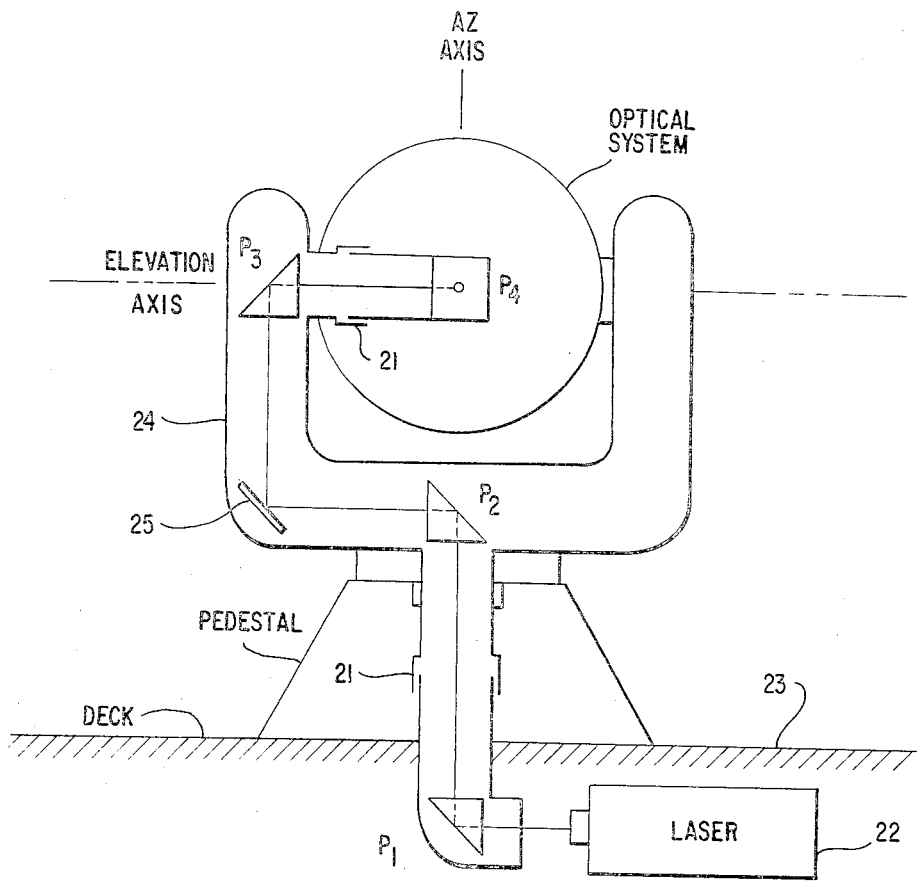
FIG. 6 illustrates a system using optical rotary joints for directing polarized light from a stationary source to any spatial direction.

A representative use for the prisms in combination with optical rotary joints capable of a 360° rotation is illustrated in FIG. 6 which schematically shows two optical rotary joints 21 in a laser radar application. Here, the laser transmitter 22 is located below deck 23 with its TEM$_{oo}$ mode beam conveyed to the optical system P$_1$–P$_4$ through rotary joints 21 in both azimuth and elevation axes. Where there is no relative rotation, as within the yoke structure 24 a conventional first-surface mirror 25 may be used to divert the beam. The principal of operation of the optical prisms is believed to be adequately set forth above in FIGS. 1 and 2.

Dual channel operation of the rotary joint is possible by employing appropriate polarization separators such as polarizing beamsplitters 31 such as a Glan-Thompson prism. Such an element resolves a beam into orthogonal linearly polarized components, diverting the two components in spatially separated directions. The same element can also be used to combine two orthogonal linearly polarized beams. A dual-channel optical rotary joint using this technique is illustrated schematically in FIG. 7. In practice, the polarizing beamsplitters are tilted so that each linearly polarized wave enters the circular-polarizing prism at the proper orientation angle. Thus, in FIG. 7, the polarizing beamsplitters shown would normally be tilted 45° about the A and A' beam axes.

While two independent channels can be realized in this way, it should be pointed out that these two channels experience opposing phase shifts during relative rotation of the prisms because they propagate between the prisms as circularly polarized waves of opposite sense. Thus, some form of phase compensation would be necessary if it is desired to preserve phase integrity through the rotary joint, as for complete polarization diversity operation. This problem is comparable to that of correcting for polarization changes in a rotary joint system employing conventional mirrors.

Figure 7:
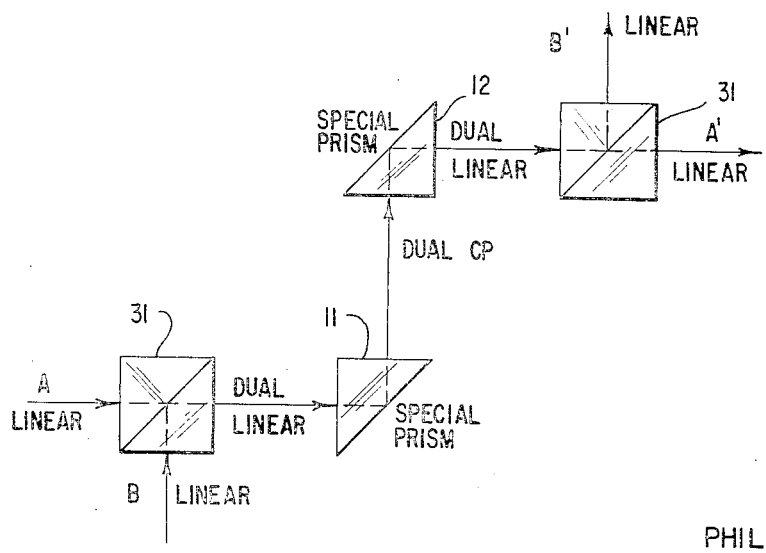
FIG. 7 illustrates a dual-channel optical system employing orthogonal polarizations.

The circular-polarizing prism rotary joint represents a simple means of propagating a linearly polarized, TEM$_{oo}$ mode beam from one part of a system to another which is in relative rotation with respect to the first, without consequent change of polarization. The simple circular-polarizing prism construction becomes feasible in the infrared region where transparent materials with refractive indices above 2.41 are available. By using a suitable polarizing beamsplitter, two independent channels can be realized (FIG. 7).

With some types of conventional first-surface mirrors used at a 45° angle of incidence, reflectivity varies with polarization of the incident wave in an undesirable manner. With total internal reflection, the reflection coefficient is theoretically unity, no less, and independent of polarization. Practically, however, some loss is introduced by the finite absorption in the material of which the prism is made, but this is very low in some materials. Additional signal loss may occur due to reflections from the faces of the prisms, however, this is reduced in practice to a very low value by employing antireflection coatings on the entrance and exit faces of the prisms. In FIG. 4, the beam is incident at some angle, 2°4' from the normal. This fact is useful in preventing any surface reflections from returning directly along the line of incidence.

Because of finite absorption of beam power in the prism material there will be a limit to the optical power which can be propagated without overheating the device. This power handling capability is maximized by use of low-loss optical materials which can withstand high temperatures without failure. This limit can also be extended by various cooling techniques. For example, the triangular end surfaces of the prisms can be cooled by almost any technique, e.g., heat sink, or direct water cooling.

If the input beam happens to be elliptically polarized, this can be converted to the desired linear polarization by introduction of an appropriate birefringent plate. The degree of birefringence of this plate, and its angular orientation are of course related to the original beam polarization.

Also, one can operate on the output polarization with a birefringent plate. For example, the output linear polarization can be converted to circular polarization by means of a quarter-wave plate, or the plane of polarization of the output linearly polarized wave can be changed independently by introducing a half-wave plate and rotating this to change the plane of polarization.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A system for directing a linear polarized light from a fixed light source on one level to a light output in any non-fixed direction on another level without an effective change in its polarization; which comprises,
   a light source that produces polarized light,
   a first fixed prism for receiving said polarized light from said source and refracting light therefrom as circularly polarized light,
   a second fixed prism mounted on a 360° rotatable member and positioned in optical alignment with said first prism for receiving circularly polarized light from said first prism, and
   said second prism refracting linearly polarized light therefrom which may be directed in any direction in a plane relative to the light source.

2. A system as claimed in claim 1; which includes,
   a mirror fixed on said rotatable member in optical alignment with said second prism for receiving polarized light and reflecting said polarized light to a right angle with respect to incident light from said second prism,
   a third prism fixed on said rotatable member in optical alignment with said mirror for receiving polarized light reflected from said mirror,
   said third prism receiving said polarized light from said mirror and refracting circularly polarized light therefrom,
   a second rotatable member,
   a fourth prism fixed on said second rotatable member in optical alignment with said third prism,
   said fourth prism receiving circularly polarized light from said third prism and refracting linearly polarized light therefrom,
   whereby said fourth prism rotates on said rotatable member with said second and third prisms and is fixed on said second rotatable member which is rotatable in a plane perpendicular to the plane of rotation of said second prism.

3. A system for directing two separate linear polarized beams of light from different fixed light sources to two different light sources rotatable with respect to said fixed light sources; which comprises,
   a first polarizing beamsplitter for receiving two separate beams of light from directions normal to each other and combining said beams into a single dual linear polarized beam,
   a first fixed prism positioned in optical relationship with said first polarizing beamsplitter to receive a dual linear polarized beam from said first polarizing beamsplitter,
   said first fixed prism refracting said received beam as a dual circular polarized light beam,
   a second prism fixed on a 360° rotatable member,
   said second prism fixed in optical relationship with said first prism to receive the dual circular polarized light from said first prism and to refract a dual linear polarized light beam therefrom, and
   a second polarizing beamsplitter fixed on said rotatable member in optical relationship with said second prism to receive the dual linear polarized light beam from said second prism,
   whereby the dual radiation beam received by said second polarizing beamsplitter is directed out as two separate linear polarized beams at right angles to each other.

* * * * *